(12) United States Patent
Sasaki (10) Patent No.: US 7,986,366 B2
(45) Date of Patent: Jul. 26, 2011

(54) OPTICAL LOW PASS FILTER AND IMAGE PICKUP APPARATUS HAVING THE SAME

(75) Inventor: Toru Sasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/468,042

(22) Filed: May 18, 2009

(65) Prior Publication Data

US 2009/0231481 A1  Sep. 17, 2009

Related U.S. Application Data

(63) Continuation of application No. 11/282,406, filed on Nov. 18, 2005, now Pat. No. 7,551,221.

(30) Foreign Application Priority Data

Nov. 22, 2004  (JP) .................................. 2004-337135

(51) Int. Cl.
*H04N 5/225* (2006.01)
(52) U.S. Cl. ........................................................ 348/342
(58) Field of Classification Search .................. 348/342; 359/494–498
See application file for complete search history.

(56) References Cited

U.S. PATENT DOCUMENTS

| 5,029,010 A | 7/1991 | Shiraishi |
| 5,555,129 A * | 9/1996 | Konno et al. ................. 359/569 |
| 6,549,336 B2 | 4/2003 | Tamaru et al. |
| 7,551,221 B2 * | 6/2009 | Sasaki ........................... 348/342 |
| 2004/0080659 A1 | 4/2004 | Iwane et al. |
| 2007/0031140 A1 | 2/2007 | Biernath et al. |

FOREIGN PATENT DOCUMENTS

| JP | 49-024033 A | 3/1974 |
| JP | 02-146018 A | 6/1990 |
| JP | 8-15646 A | 1/1996 |
| JP | 9-185019 A | 7/1997 |

OTHER PUBLICATIONS

MTF and picture quality, O Plus E, No. 214,96-103 (Sep. 1997)—in Japanese.
Notification of Reason for Refusal issued in corresponding Japanese Patent Application No. 2004-337135 dated Jan. 11, 2011.

* cited by examiner

*Primary Examiner* — Timothy J Henn
(74) *Attorney, Agent, or Firm* — Rossi, Kimms & McDowell LLP (57) ABSTRACT

An optical low pass filter includes one portion that splits an incident light beam into plural light beams having a predetermined split width in a predetermined direction, and emits the light beams, and another portion that splits the incident light beam into plural light beams having a split width different from the predetermined split width in the predetermined direction, and emits the light beams.

8 Claims, 8 Drawing Sheets

OPTICAL LOW PASS FILTER AND IMAGE PICKUP APPARATUS HAVING THE SAME

CROSS REFERENCE TO RELATED APPLICATION

This is a continuation of and claims priority from U.S. patent application Ser. No. 11/282,406 filed Nov. 18, 2005, the content of which is incorporated herein by reference.

BACKGROUND OF THE INVENTION

1. Field of the Invention

The present invention relates to an optical low pass filter and an image pickup apparatus having the optical low pass filter.

2. Related Background Art

Presently, an image sensor having 5,000,000 or more pixels has been developed, and this high performance image sensor has been employed in a digital camera. However, there is a case where a false color or Moiré fringes are mixed in an obtained image, and there are many problems of the comprehensive image quality to be solved.

In general, in the image pickup system using the solid-state image pickup element having a discrete pixel structure, image information is optically spatially sampled to obtain an output image. In this case, when a high spatial frequency component that is equal to or higher than a sampling frequency is contained in an object, a false signal of a structure, a hue, or the like which is different from that of the object is generated.

In other words, a frequency component that cannot be obtained by the image pickup system (a frequency component that exceeds a Nyquist frequency) cannot be reproduced as image information, which causes a so-called wave shape distortion, the Moiré fringes, the false color, or the like to be formed. For that reason, up to now, an optical low pass filter is disposed in a part of the image pickup system to restrict the high spatial frequency component of the object.

There have been proposed various types of optical low pass filters and the image pickup systems having the optical low pass filters (refer to Japanese Patent Application Laid-Open No. H09-185019 and Japanese Patent Application Laid-Open No. H08-015646).

The false color and the Moiré fringes are classified into a nose that is called "aliasing noise". The aliasing noise occurs when a high frequency component of an image that has been focused by a lens system interferes with a sampling pattern of the image sensor.

The normal noises can be suppressed to some extent by taking a statistical property into consideration, but there are many cases where the aliasing noise globally occurs depending on the object, and therefore it is difficult to apply a countermeasure against the normal noises to the aliasing noise.

An optical low pass filter is generally employed to suppress the aliasing noise. The optical low pass filter suppresses the amplitude of a frequency component which is higher than the Nyquist frequency which causes the aliasing noise.

An optical element having birefringence such as a crystal plate, or phase diffraction gratings are employed for the optical low pass filter. Among those elements, the optical element using the birefringence is frequently employed because a relatively precipitous cutoff character is obtained.

On the other hand, as another system for suppressing the aliasing noise, there has been proposed a system in which a microlens array is disposed immediately in front of the image sensor, and the lens configuration of the microlens array changes according to the pixel position (OplusE, Vol. 19, No. 9 (September, 1997)).

In this system, light beams that are subjected to defocus differently in each of the positions of a light receiving element enter the respective light receiving elements (the respective pixels) of the image sensor, to thereby realize an excellent MTF. In this system, although the noises occur, the excellent cutoff characteristic is obtained as compared with the normal microlens array.

Figure 2:
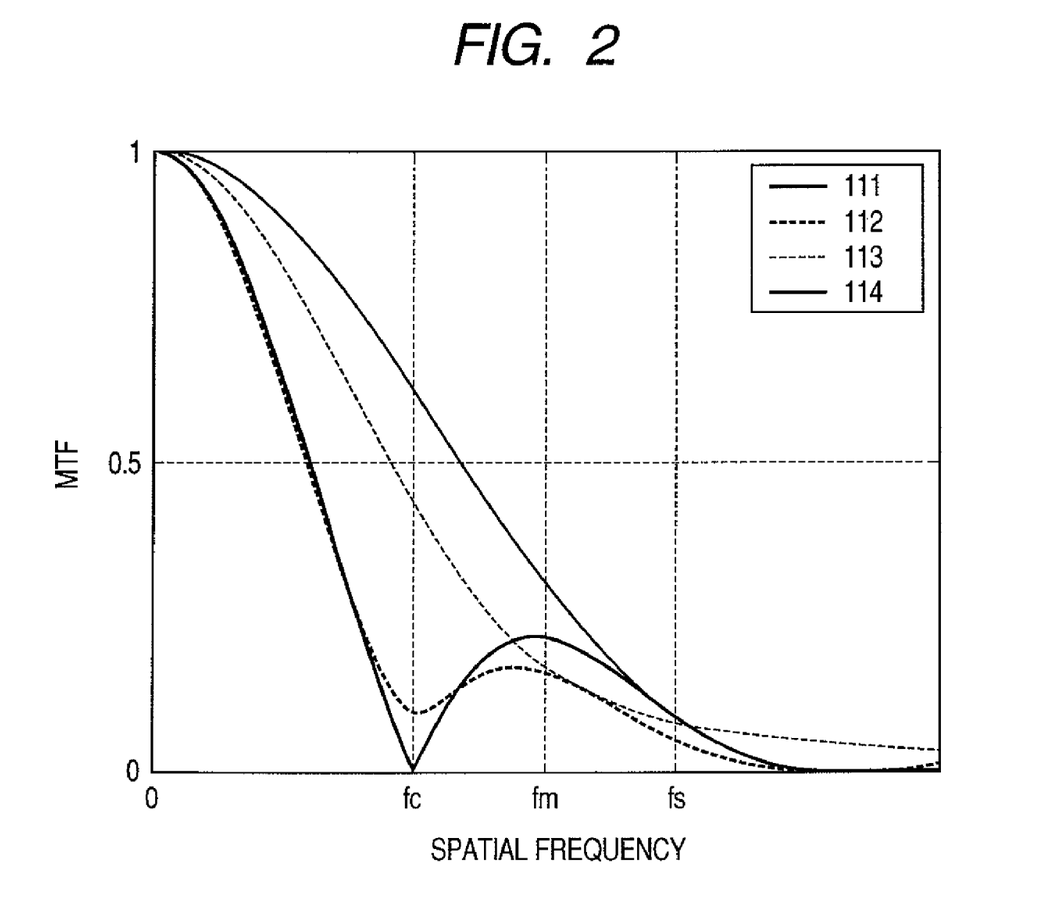
FIG. 2 is a graph showing differences in MTF between an aliasing noise suppression filter 102 and other low pass filters.

FIG. 2 shows an MTF 111 of an optical low pass filter using the birefringence. The optical low pass filter using the birefringence is not an optical element that perfectly suppresses the components with frequency of the cutoff frequency fc or higher, and transmits a fair amount of the components. For that reason, in the case where the object has the frequency component that is equal to or higher than the cutoff frequency fc, the Moiré fringes dominantly appear. Also, the system proposed by OplusE, Vol. 19, No. 9 (September, 1997) cannot obtain the sharp cutoff characteristic as in the birefringence system because the proposed system is based on the MTF of the lens array.

SUMMARY OF THE INVENTION

An object of the present invention is to provide an optical low pass filter that can obtain an excellent cutoff characteristic and averagely attenuates the MTF of a high frequency component.

An optical low pass filter according to an example of the present invention includes one portion that splits an incident light beam into plural light beams having a predetermined split width and emits the split light beams in a predetermined direction, and another portion that splits the incident light beam into plural light beams having a split width which is different from the predetermined split width and emits the split light beams in the predetermined direction.

DESCRIPTION OF THE PREFERRED EMBODIMENTS

Now, a description will be given of an optical low pass filter and an image pickup apparatus having the optical low pass filter according to embodiments of the present invention.

First Embodiment

Figure 1A:
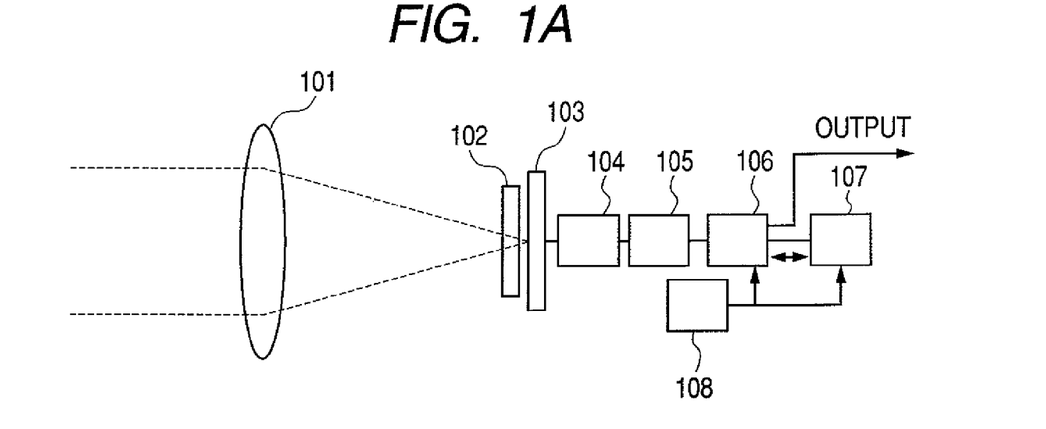
FIGS. 1A, 1B, 1C and 1D are diagrams for explaining an image pickup apparatus and an aliasing noise suppression filter according to a first embodiment, respectively.

FIG. 1A is a schematic diagram showing a main portion of an image pickup apparatus having an optical low pass filter according to a first embodiment. Referring to FIG. 1A, a light from an object is focused on a color image sensor 103 by a lens system (photographing optical system) 101. The color image sensor 103 is formed of a single plate type image sensor having arbitrarily arranged color filters and a condensing microlens array. An aliasing noise suppression filter (optical low pass filter) 102 is disposed between the lens system 101 and the image sensor 103. The aliasing noise suppression filter 102 has a function of suppressing a high frequency component from image information.

The aliasing noise suppression filter 102 is disposed immediately in front of a light incident side of the image sensor 103. An optical image that has been formed by the lens system 101 is subjected to photoelectric conversion by the image sensor 103. A signal that has been subjected to photoelectric conversion is subjected to density quantization by an A/D conversion processing part 104, and subjected to an interpolation process by a color interpolation process portion 105. The image information that has been obtained by the color interpolation process portion 105 is saved in a main memory 106. The image pickup apparatus according to this embodiment has an image processing processor 107, and executes a color reproduction process and a compression process according to a control signal from a controller 108.

Figure 1B:
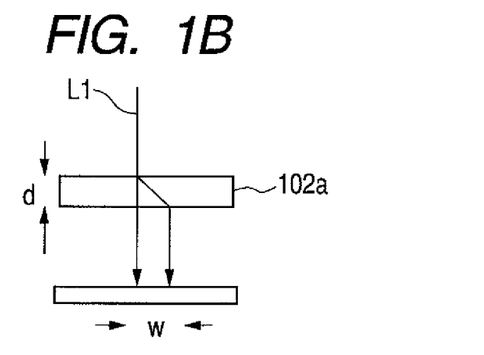

The aliasing noise suppression filter 102 uses an optical operation of an optical element having a birefringence. FIG. 1B shows an example of the spatial movement of a polarization component by an optical element 102a having the birefringence. The optical element 102a having the birefringence such as crystal has a property that an optic axis of crystal is set in a specific direction so as to split an incident light beam LI into two parallel light beams (an ordinary ray and an extraordinary ray) whose vibration directions are orthogonal to each other. The separation width w (that is, spatial movement distance) between those two light beams are proportional to the thickness d of the optical element 102a.

The aliasing noise suppression filter 102 according to this embodiment laterally shifts a part of the ray from the light incident surface with respect to the light traveling direction and emits the shifted light. Then, the aliasing noise suppression filter 102 makes the lateral shift amount of the ray in the same direction different according to the incident positions on the incident surface of the aliasing noise suppression filter 102. That is, the aliasing noise suppression filter 102 has one portion that splits an incident light beam into plural light beams having a predetermined split width and emits the split light beams into a predetermined direction, and has another portion that splits the incident light beam into plural light beams having a split width which is different from the predetermined split width and emits the split light beams in the predetermined direction.

The aliasing noise suppression filter 102 prepares a concave and convex configuration on the surface of the optical element having the birefringence and changes the light traveling direction depending on the area, to thereby provide a change in the spatial movement distance.

In a portion where the element thickness is large, the spatial movement distance of the extraordinary ray increases because the optical path length in the optical element increases. That is, a split width between the ordinary ray and the extraordinary ray becomes large. On the other hand, in a portion where the element thickness is small, the reverse effect is obtained, and the split width between the ordinary ray and the extraordinary ray becomes small as compared with the thick portion of the element.

Figure 1C:
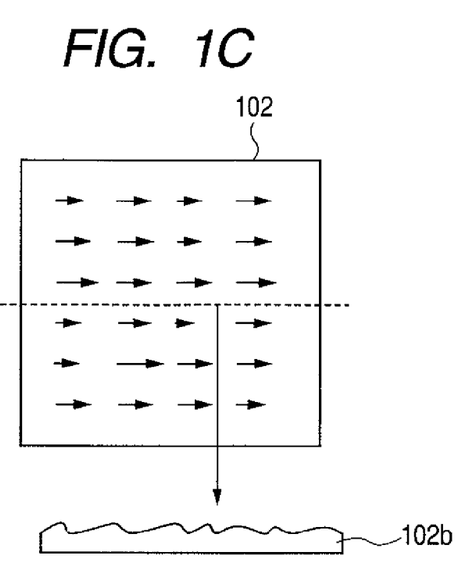
Figure 1D:
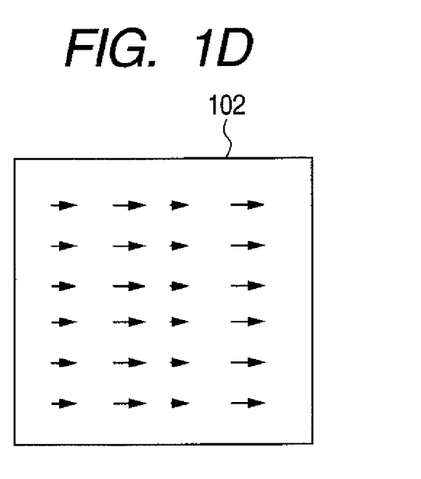

FIGS. 1C and 1D show an example of a distribution of the spatial movement distance (light beam split width) according to the light beam incident positions of the aliasing noise suppression filter 102. In the aliasing noise suppression filter 102 shown in FIG. 1C, the respective points (the respective areas) on the light incident surface are set to the distribution having the spatial movement distances different in a two-dimensional direction (a spatial movement direction and a direction orthogonal to the spatial movement direction). In the aliasing noise suppression filter 102 shown in FIG. 1D, the respective points on the light incident surface are set to a distribution having the spatial movement distances different only in the spatial movement direction.

The aliasing noise suppression filter 102 shown in FIG. 1D can be realized by cutting the surface of the optical low pass filter which is made of, for example, crystal, and by forming a large number of linear grooves. On the other hand, in the case of preparing a complicated concave and convex configuration distribution similar to the aliasing noise suppression filter 102 shown in FIG. 1C, an etching process or the like can be employed.

In order to obtain a desired MTF with respect to a light beam that has passed through the lens system 101, it is necessary that the distribution of the spatial movement distance of the incident light is controlled in the aliasing noise suppression filter 102. As a control method, a method of probabilistically determining the movement distance or a method of optimizing the movement distance distribution in association with the desired MTF can be applied.

Now, the former method will be described. In this control method, a uniform random number $r_{xy}$ is first generated between −1 and 1 with respect to center position coordinates (x, y) of an opening corresponding to one pixel of the image sensor 103. Then, the spatial movement distance $S_{xy}$ at the position (x, y) is calculated from the maximum value $S_{max}$ and the minimum value $S_{min}$ of the spatial movement distance which has been selected in advance according to the following expression.

$$S_{xy}=(S_{max}+S_{min})/2+(S_{max}-S_{min})\times r_{xy}/2 \quad (1)$$

The maximum value $S_{max}$ and the minimum value $S_{min}$ are arbitrarily selected, but a mean value of the maximum value $S_{max}$ and the minimum value $S_{min}$ is selected so as to be a specific spatial movement distance S', thereby making it possible to obtain the same MTF characteristic as that of the low pass filter of the ordinary birefringence type corresponding to the spatial movement distance S' with respect to the low frequency component.

In addition, though the value $r_{xy}$ is selected by using the uniform random number in this control method, the controllability of the MTF can be improved by, for example, introducing a selection probability distribution such as a Gaussian distribution with 0 as a center, and selecting a numeric value.

Finally, the surface configuration d(x, y) of the aliasing noise suppression filter 102 is approximately obtained by the following expression.

$$d(x, y) = k \times S(x, y) \qquad (2)$$

where k is a proportional constant based on the birefringence of the optical element, and S(x, y) is a continuous distribution obtained by interpolating $S_{xy}$. The above expression is an approximation because an influence of the refraction according to the light incident surface is not considered. In the case where a change in the surface configuration is large, a precision in approximation is acknowledged as a problem. However, in this embodiment, a distribution that continuously changes is assumed, and the influence of the approximation is small.

FIG. 2 shows a difference in the MTF between the aliasing noise suppression filter 102 that is prepared according to the above method of this embodiment and other optical low pass filters. Because those MTFs do not consider an influence of the lens system, an actual MTF is configured so as to further suppress the high frequency component. Also, because the aliasing noise suppression filter 102 is different in defocus amount according to the position, the MTF cannot be directly obtained from a point image response. For that reason, the mean value of the MTFs which are obtained from the point image distribution is set as the MTF of the image pickup system.

Referring to FIG. 2, reference numeral 111 is an MTF according to an ordinary image pickup system structure considering the birefringence low pass filter and the microlens array for improving the opening degree which is attached to a solid-state image pickup element. The MTF 111 has a transmission frequency band between a cutoff frequency fc and a sampling frequency fs.

For that reason, when an original image has a component that is large in amplitude at the spatial frequency fm, Moiré fringes are liable to occur in the obtained image. On the other hand, the MTF 112 considering the aliasing noise suppression filter 102 and the opening degree improvement microlens array according to this embodiment averagely suppresses the high frequency component as compared with the MTF 111.

From the above viewpoint, it is found that the aliasing noise suppression filter 102 has an aliasing noise suppression performance higher than that of the ordinary low pass filter except for the vicinity of the cutoff frequency fc. On the other hand, the MTF 113 of the microlens array of which the opening configuration is changed at random has been proposed by the above-mentioned OplusE, Vol. 19, No. 9 (September in 1997) is so configured as to suppress the high frequency component of the MTF 114 of the ordinary opening degree improvement microlens array.

However, because the above-mentioned method of OplusE, Vol. 19, No. 9 (September, 1997) obtains nothing other than an attenuation characteristic that is close to a line shape with respect to a spatial frequency, it is difficult to obtain a precipitous cutoff characteristic as an ordinary low pass filter by using a birefringence.

According to the first embodiment, an optical low pass filter can be obtained which has an aliasing noise suppression performance higher, in the almost high frequency range, than that of an ordinary birefringence type low pass filter and has cut off characteristics better than that of a method using the microlens array in which the shapes of the apertures are randomly changed

Second Embodiment

Now, an image pickup apparatus according to a second embodiment will be described.

The image pickup apparatus according to the second embodiment is substantially identical in structure with the first embodiment, but is different in the structure of the aliasing noise suppression filter 102. An aliasing noise suppression filter 201 according to the second embodiment will be described with reference to FIGS. 3A, 3B, 3C, and 3D.

Figure 3A:
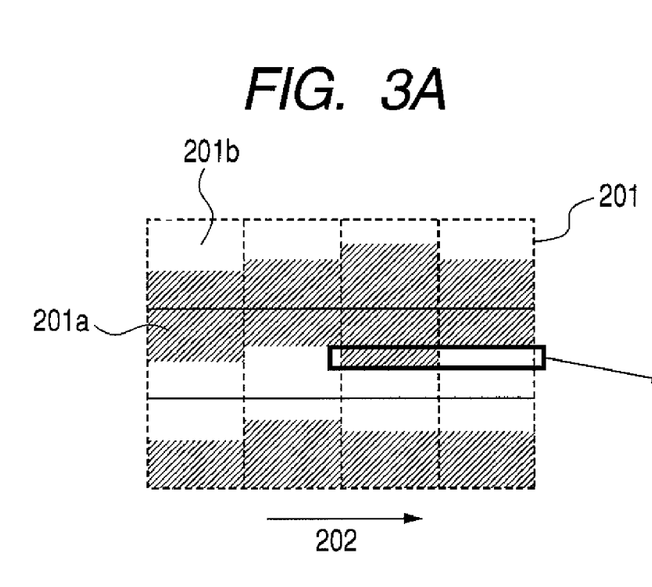
FIGS. 3A, 3B, 3C, and 3D are diagrams for explaining an aliasing noise suppression filter according to a second embodiment, respectively.

Referring to FIG. 3A, the aliasing noise suppression filter 201 is formed of a refraction type low pass filter which is made up of two areas of an oblique portion 201a and a white portion 201b.

In principle, it is not necessary to provide two kinds of areas different in thickness, but only plural areas different in thickness are required. Hereinafter, a surface of the thick area 201a is called "first portion", and a surface of the thin area is called "second portion". The raw material of the aliasing noise suppression filter 201 is made of a crystal plate as in the first embodiment, and the surface configuration is prepared through an etching process.

Figure 3B:
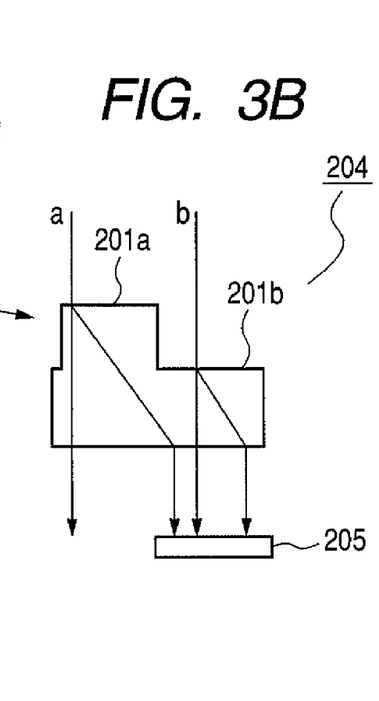

The spatial movement of the polarization component due to the crystal plate occurs in a direction indicated by an arrow 202. As shown in FIG. 3B, the height of the two portions 201a and 201b are arbitrary, and the mean value of the thickness of those two portions is selected so as to correspond to the spatial movement at an interval of the color filter in this embodiment.

Figure 3C:
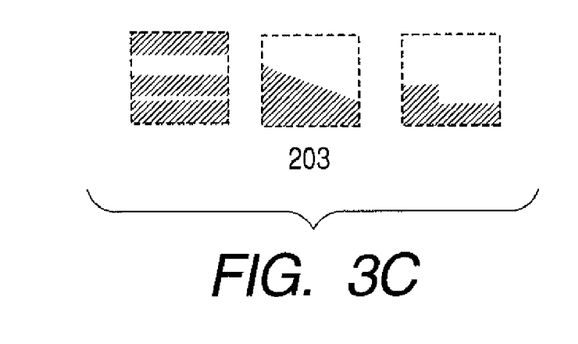
Figure 3D:
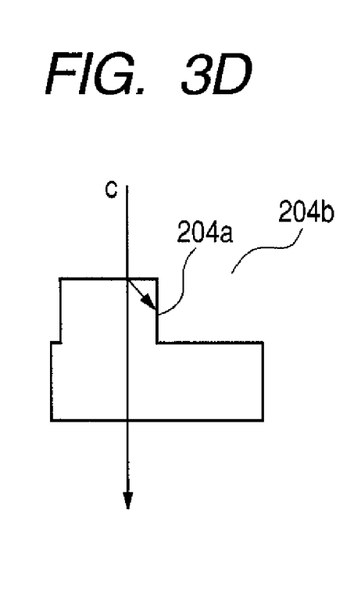

Gratings indicated by dotted lines in FIG. 3C represent a correspondence with the opening of the color filter. A boundary between the first portion 201a and the second portion 201b is arbitrarily set according to the color filter opening.

In this embodiment, the boundary is set so that the area ratio of the respective portions within the color filter opening will be selected at random in each of the positions. In setting the boundary, the area ratio of the respective portions becomes important as will be described later. For that reason, there principally occurs no problem even if the boundary of the first and second portions is determined as indicated in various patterns in FIG. 3C.

A description will be given of an aliasing noise suppression effect with reference to a sectional configuration 204 of the aliasing noise suppression filter 201 shown in FIG. 3B. The sectional configuration 204 corresponds to an area having a first portion 201a at a left side and a second portion 201b at a right side. Two light beams that are different in the spatial movement distance as indicated by the light beams a and b enter the color filter 205 at the same time. In this example, it is assumed that, among the light beams that enter the color filter 205, a ratio of light beams (light amount) which enter the color filter 205 through the first portion 201a and the second portion 201b, respectively, is m:n, a movement distance of the light beam a is $S_1$, and a movement distance of the light beam b is $S_2$. In this condition, a light receiving element that is disposed in the rear of the color filter 205 obtains the same effect as that in the case of the spatial movement of a mean distance $S_a$ which will be described below, because the light intensity is averaged.

$$S_a = (m \times S_1 + n \times S_2)/(m+n) \qquad (3)$$

Figure 4:
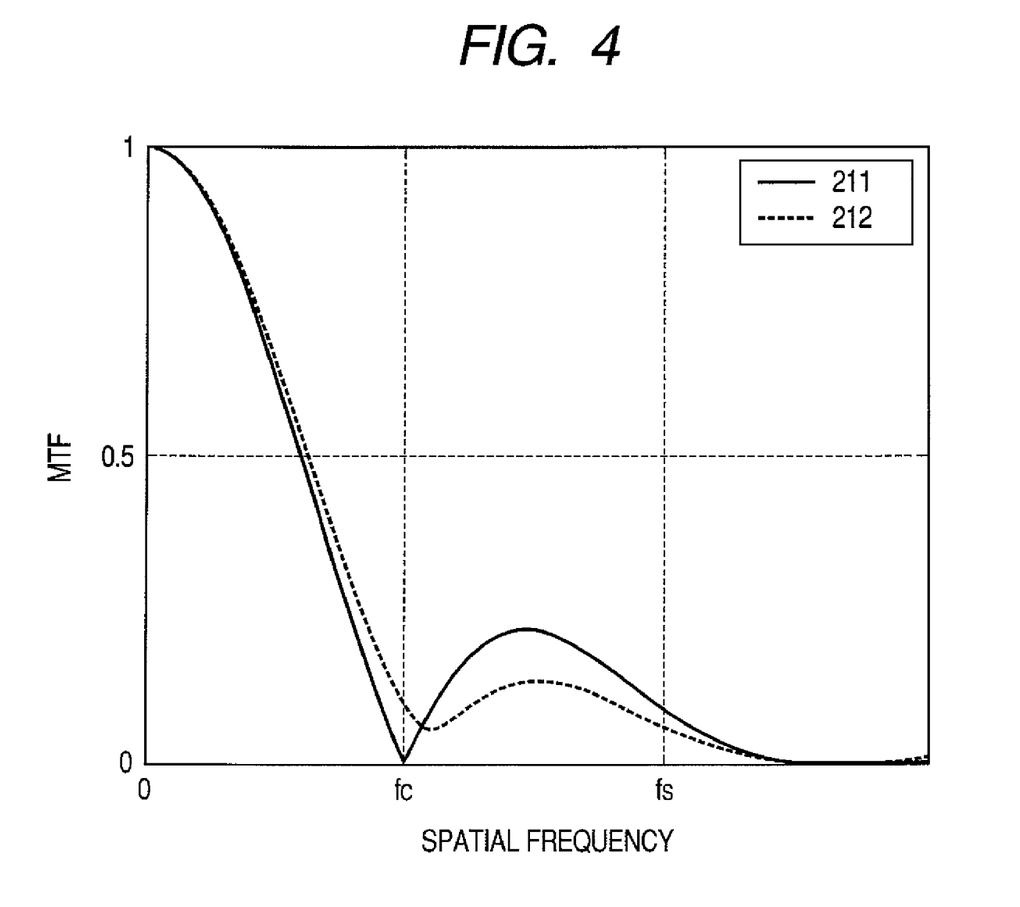
FIG. 4 is a graph showing the MTF of an aliasing noise suppression filter 201.

In the aliasing noise suppression filter 201, the boundary between the first portion 201a and the second portion 201b is set so as to fluctuate above the openings of the respective color filters 205. As a result, because the area ratio between the first portion 201a and the second portion 201b becomes spatially uneven, the mean spatial movement distance distribution represented by Expression (3) becomes spatially uneven. An example of the MTF obtained at this time is shown in FIG. 4. An MTF whose frequency component larger than the cutoff frequency fc is suppressed is obtained as in the first embodiment.

Figure 5A:
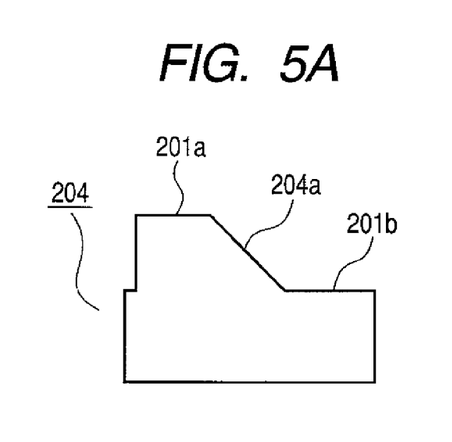
FIGS. 5A and 5B are diagrams showing a manner for reducing a light amount loss due to a boundary between area surfaces which change an optical path length on a light incident surface, respectively.
Figure 5B:
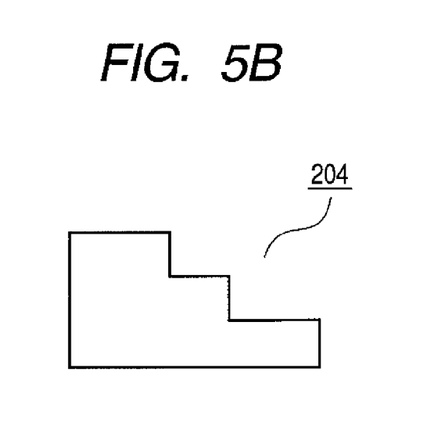

This embodiment shows the structure of the filters due to the two portions 201a and 201b. However, when those two portions are employed, a light beam c that passes through a section 204b shown in FIG. 3D reaches a boundary 204a of the portions, and does not contribute to the realization of the image shift, which causes a loss of the light amount. In order to prevent this situation, it is preferable to apply a structure in which the boundary 204a is inclined, or a structure in which the number of portions different in thickness is increased to reduce a vertical interval of the boundary as shown in FIGS. 5A and 5B.

As described above, the low pass filter 201 according to this embodiment splits the light beam by using the birefringence, and the lateral shift amount (split width) of the respective areas (portions) of the light incident surface is made different by changing the optical path length of the light beams which pass through the respective portions of the low pass filter 201.

As a result, the second embodiment obtains the optical low pass filter that is made up of a small mount of portions, which is easy in design and manufacture, and obtains the same aliasing noise suppression effect as that in the first embodiment.

Third Embodiment

Now, an image pickup apparatus according to a third embodiment will be described.

The image pickup apparatus according to the third embodiment is substantially identical in structure with the first and second embodiments, but is different in the structure of the aliasing noise suppression filter. The aliasing noise suppression filter according to this embodiment has a prism array, and makes the refraction angles of the light beams that enter the respective portions different by means of the prism array, thereby making the light split width in a predetermined direction different according to an incident position. An aliasing noise suppression filter 301 according to the third embodiment will be described with reference to FIG. 6A.

Figure 6A:
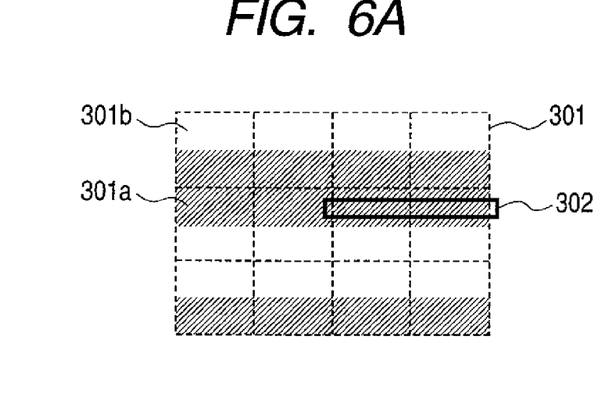
FIGS. 6A and 6B are diagrams for explaining an aliasing noise suppression filter according to a third embodiment, respectively.
Figure 6B:
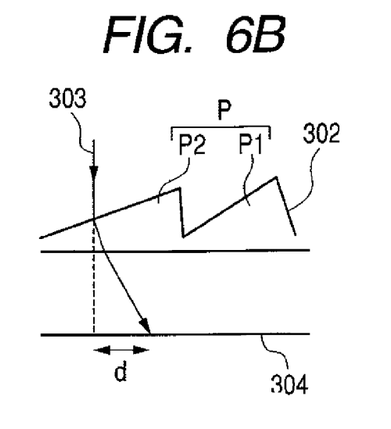

Referring to FIG. 6A, the aliasing noise suppression filter 301 is a refraction type low pass filter which is made up of two areas of an oblique portion 301a and a white portion 301b. The area of the white portion 301b is planar, and a fine prism P that is configured as shown in FIG. 6B is arranged in the oblique portion 301a. Frames indicated by dotted lines correspond to the respective color filters and openings of the respective light receiving elements.

FIG. 6B shows a section 302 of an oblique portion 301a shown in FIG. 6A.

A light beam that has entered the oblique portion 301a is bent by a fine prism P and outputted. The inclined angle of the inclined plane of the respective prisms P may be arbitrarily set if the inclined angle is not a constant value. In this embodiment, prisms P1 and P2 with two kinds of oblique angles are arranged at random so that the light beam passing through the optical element 301 spatially moves by distances of 40% and 60% of an interval of the light receiving elements (pixel pitch) when the light beam reaches a light receiving surface 304. As a result, because a state in which the spatial movement distance d is changed can take place according to the prism, the MTF can be controlled as in the first and second embodiments. Though there can be applied various methods of fabricating the prism array, in this embodiment, the prism array is prepared by using a molding technique with a thermal curing resin as a material.

Other various structures can be applied to the aliasing noise suppression filter 301.

Figure 7A:
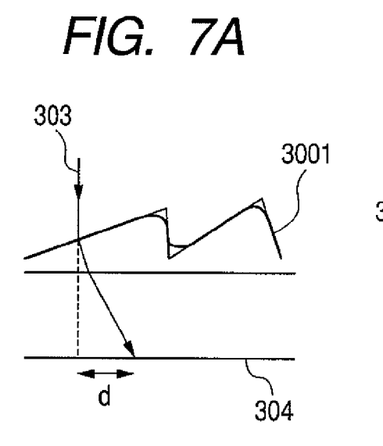
FIGS. 7A, 7B, and 7C are diagrams for explaining a structural method of an aliasing noise suppression filter 301, respectively.
Figure 7B:
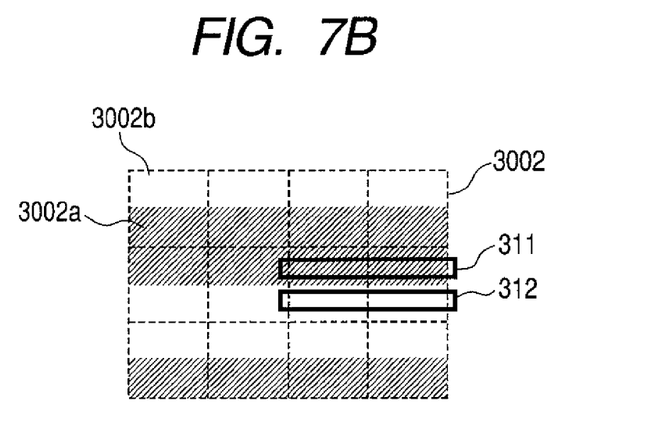

The structures shown in FIGS. 7A and 7B can be applied as examples.

An aliasing noise suppression filter 3001 shown in FIG. 7A in which discontinuous surfaces of the prism array is blurred and changed into a continuous surface.

In the original structures shown in FIGS. 6A and 6B, a stray light may occur on a discontinuous end surface. To the contrary, the influence of the discontinuous surface can be mitigated by using an aliasing noise suppression filter structure 3001.

In an aliasing noise suppression filter 3002 shown in FIG. 7B, a planar area is not prepared.

Figure 7C:
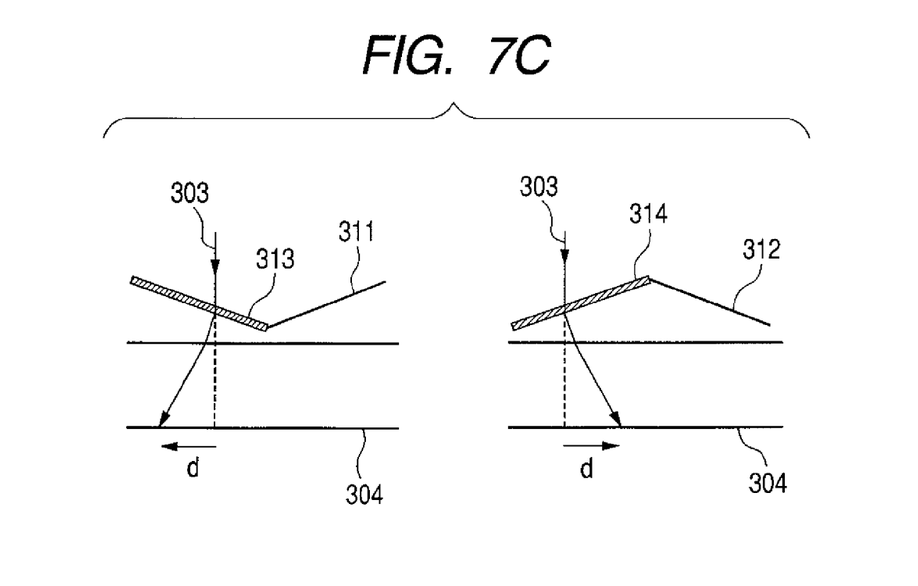

In the original structures shown in FIGS. 6A and 6B, the planar area indicated by the white portion 301b and the prism area indicated by the oblique area 301a are prepared. However, in the aliasing noise suppression filter 3002, a prism is prepared even in an area 3002b indicated by a white portion. FIG. 7C shows a section 311 of an oblique area 3002a and a section 312 of the white area 3002b.

In the following description, an oblique angle of an oblique surface 313 within the section 311 is negative, and an oblique angle of an oblique surface 314 within the section 312 is positive, and the respective oblique surfaces are called "negative oblique surface" and "positive oblique surface", respectively. In the white portion 3002b and the oblique area 3002a, the negative oblique surface and the positive oblique surface are prepared in order. The oblique surfaces of the white area 3002b and the oblique area 3002a which are positioned above the same light receiving element opening (square area surrounded by a broken line shown in FIG. 7B) are set so as to reverse the positive and negative. The negative oblique surface has an effect of causing the incident light beam to spatially move in a direction opposite to that in the case of the positive oblique surface. Now, let us consider a position on the light receiving element of the incident light beam that has been bent by the oblique surface 313 as a reference. In this case, the incident light beam that has been bent by the oblique surface 314 relatively moves by a distance corresponding to the sum of the spatial movement distances due to the oblique surfaces 313 and 314.

Under the above circumstances, the oblique angles of all the negative oblique surfaces are set to a constant value, and the oblique angles of the positive oblique surfaces are changed to change the relative spatial movement distance of the light beam. As a result, the same effects as those of the original structures shown in FIGS. 6A and 6B are obtained. The aliasing noise suppression filter 3002 is advantageous in that the spatial movement distance of the light beam can be lengthened even if the oblique angle is small.

The MTF obtained by this embodiment is substantially identical in structure with that in the second embodiment, and therefore its description will be omitted.

As described above, the aliasing noise suppression filter according to this embodiment conducts a difference in the lateral shift amount (light beam split width) by means of the prism array in which plural prisms different in the prism vertex in each of the areas are arranged in one direction.

As a result, this embodiment obtains the optical low pass filter that obtains the same aliasing noise suppression effect as that in the first embodiment.

Fourth Embodiment

Now, an image pickup apparatus according to a fourth embodiment will be described.

The image pickup apparatus according to the fourth embodiment is substantially identical in structure with the other embodiments, but different in the structure of the aliasing noise suppression filter. The aliasing noise suppression filter according to this embodiment has diffraction gratings array and makes the diffraction angles of the light beams that enter the respective portions different by means of the diffraction grating array, thereby making the ray split width in a predetermined direction different according to the incident position.

Figure 8A:
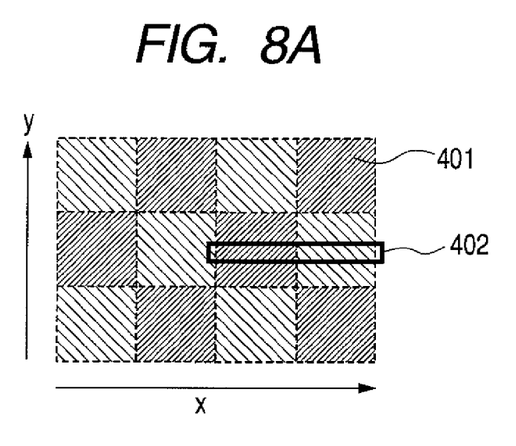
FIGS. 8A and 8B are diagrams for explaining an aliasing noise suppression filter according to a fourth embodiment, respectively.

An aliasing noise suppression filter 401 according to the fourth embodiment will be described with reference to FIG. 8A. Referring to FIG. 8A, an aliasing noise suppression filter 401 is formed of a low pass filter using a one-dimensional phase diffraction grating array. Each of the diffraction gratings is positioned above the opening, and has a grating interval that is determined in each of the diffraction gratings. A direction of the grating is set so as to be carved along a y direction, and the diffraction light occurs in an x direction.

Figure 8B:
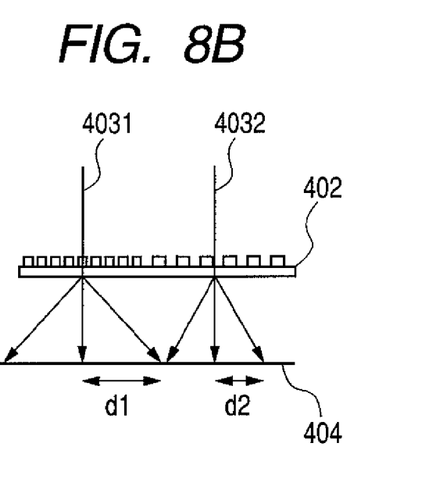

FIG. 8B shows the configuration of the diffraction gratings in a section 402, and an optical path of the incident light beam. In this embodiment, a two-level diffraction grating is used as the diffraction gratings. Alternatively, it is possible to improve the controllability of the MTF by accurately controlling the diffraction efficiency by means of a multi-level diffraction grating or a blaze diffraction grating.

Among the light beams, a 0-order light that is not diffracted goes straight and normally enters the respective light receiving elements, and a ±1-order light is diffracted and spatially moves by a distance of about the half of the light receiving element interval (pixel pitch) and enters the respective light receiving elements.

Each of the light beams operates in the same manner as the polarization component in the low pass filter using the birefringence optical element.

The aliasing noise suppression element 401 is structured in such a manner that two or more kinds of gratings are arranged in an array. The diffraction gratings are arbitrarily selected if the grating intervals are different from each other, and the arranging method is also arbitrary. In this embodiment, two kinds of diffraction gratings whose spatial movement distance of the primary diffraction light component are 50% and 70% of the light receiving element interval are alternately disposed at random so that the ratio of the respective numbers of diffraction gratings is 1:1.

The high order diffraction light can be ignored with the diffraction efficiency of the primary diffraction light as 30%.

Figure 9:
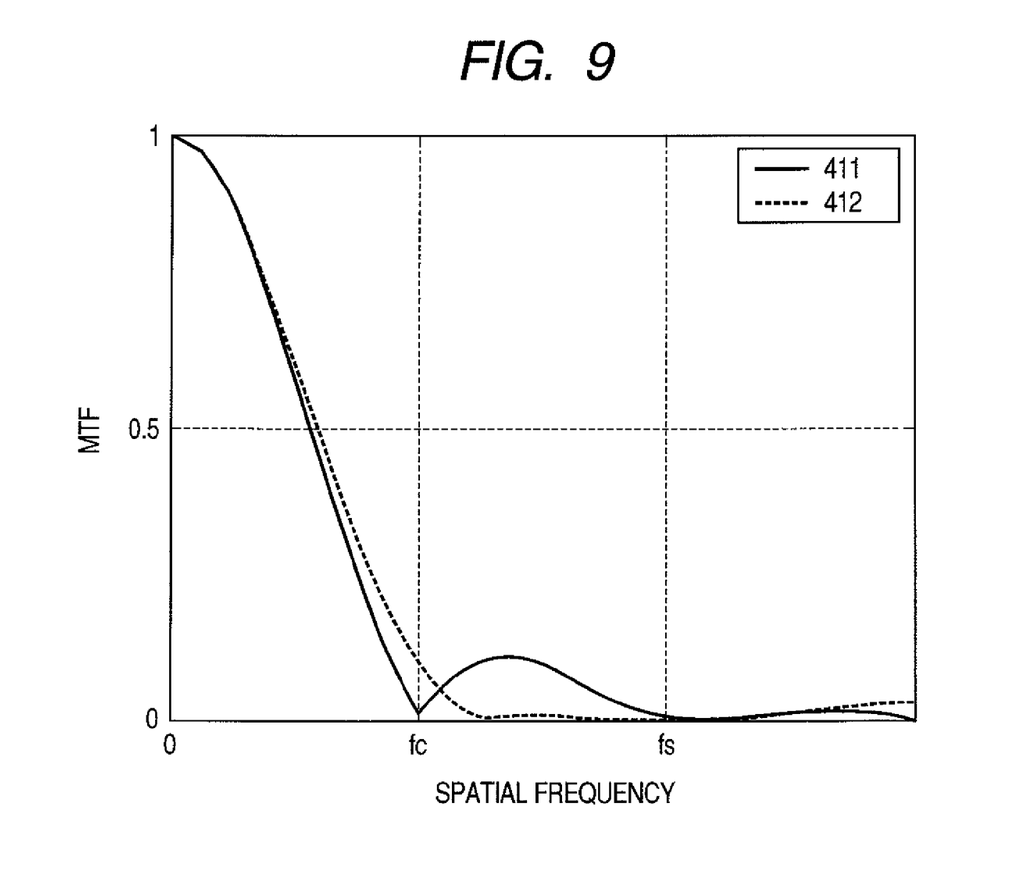
FIG. 9 is a graph for explaining the MTF of an aliasing noise suppression filter 401.

In the aliasing noise suppression filter 401, an MTF 411 when considering the light intensity averaging effect due to the light receiving element opening is configured as shown in FIG. 9. It is understood from the comparison of the ordinary birefringence optical low pass filter with an MTF 412 due to the light receiving opening, that the suppression effect with respect to the high frequency component subsequent to the cutoff frequency fc is high.

As described above, the aliasing noise suppression filter 401 according to this embodiment makes the lateral shift amount (light beam split width) different by using the diffraction grating array in which plural diffraction gratings different in the grating period are arranged in one direction.

As a result, this embodiment obtains the diffraction optical low pass filter that can control the MTF as in the first embodiment.

As described above, according to the aliasing noise suppression filters of the respective embodiments, there is provided a function of bending the optical path of the incident light beam or its partial light beam to spatially move, and the spatial movement distance (light beam split width) is made different according to the incident position, to thereby obtain an MTF more excellent than the ordinary birefringence optical low pass filter.

As the method of controlling the MTF, it is possible to use a manner of stochastically generate the distribution of the spatial movement distance (light beam split width). In this case, for example, the spatial movement distance is set as a small number of discrete numeric value, thereby making it possible to realize the distribution of the spatial movement distance with the reproducibility higher than that in the case of the continuous distribution.

Also, when the uniform distribution or the Gaussian distribution is used as the selection probability distribution, the MTF of the high frequency component can be controlled while the MTF with respect to the frequency component lower than the cutoff frequency maintains the same precipitous cutoff characteristic as that the ordinary low pass filter.

The continuous concave and convex configuration is prepared on the surface, thereby making it possible to change the spatial movement distance according to the position on the surface of the optical low pass filter.

When plural surfaces different in height are prepared on the light incident surface, the optical low pass filter that is easy in manufacture and high in the reproducibility of the configuration is obtained.

The boundaries of the respective portions different in the spatial movement distance (light beam split width) of the light beam are set so that the area ratio of the respective surfaces become a predetermined value in each of the light receiving element opening of the solid-state image pickup element, and the area ratio is determined. With this structure, the distribution of the continuous spatial movement distance is obtained in a pseudo fashion, and the MTF is readily controlled.

When the refraction due to plural fine prisms having different refracting angles is used, the spatial movement distance can be changed according to the position on the surface.

The spatial movement distance can be changed according to the position on the surface by the diffraction effect attributable to the fine diffraction gratings having the different grating intervals.

Subsequently, a description will be given of embodiments of a video camera and a digital still camera as the image pickup apparatus using the optical low pass filter according to the present invention with reference to FIGS. 10 and 11.

Figure 10:
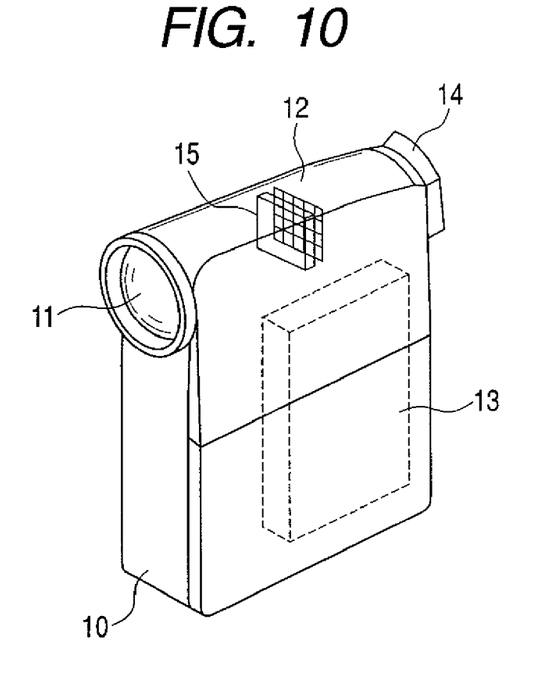
FIG. 10 is an explanatory diagram showing an image pickup apparatus according to the present invention.

Referring to FIG. 10, reference numeral 10 denotes a video camera main body, 11 denotes a photographing optical system, 15 denotes an optical low pass filter according to the present invention, and 12 denotes a solid-state image pickup element (photoelectric conversion element) such as a CCD sensor or a CMOS sensor which receives an image by the photographing optical system 11. Also, reference numeral 13 denotes a memory that stores information corresponding to the image that has been subjected to photoelectric conversion by the image pickup element 12, and 14 denotes a finder for observing the image that is displayed on a display element which is not shown. The above-described display element is formed of a liquid crystal panel, and the like, and displays the image formed on the image pickup element 12.

Figure 11:
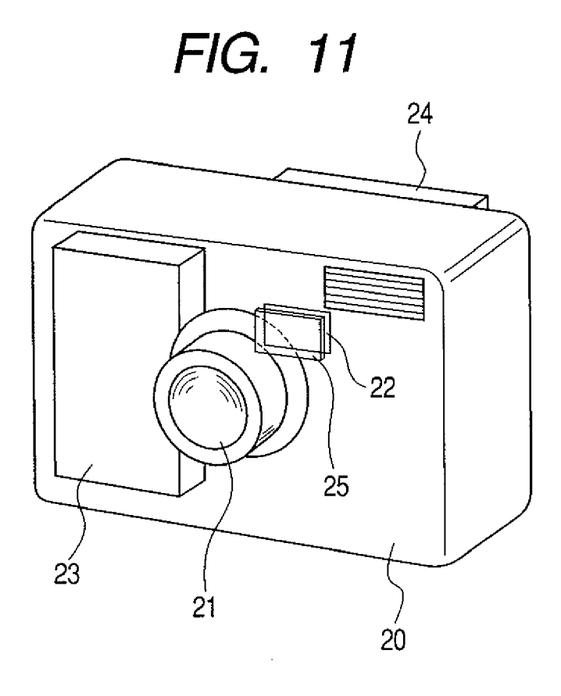
FIG. 11 is an explanatory diagram showing the image pickup apparatus according to the present invention.

Referring to FIG. 11, reference numeral 20 denotes a camera main body, 21 denotes a photographing optical system, 25 denots an optical low pass filter according to the present invention, and 22 denotes a solid-state image pickup element (optical conversion element) such as a CCD sensor or a CMOS sensor which receives the image formed by the photographing optical system 21. Also, reference numeral 23 denotes a memory that stores information corresponding to the image that has been subjected to photoelectric conversion by the solid-state image pickup element 22, and 24 denotes a finder for observing the image formed of a liquid crystal display panel, and the like, and formed on the solid-state image pickup element 22.

As described above, the image pickup apparatus having the higher optical performance is realized by applying the optical low pass filter of the present invention to the optical system of the image pickup apparatus such as a video camera or a digital still camera.

This application claims priority from Japanese Patent Application No. 2004-337135 filed on Nov. 22, 2004, which is hereby incorporated by reference herein.

What is claimed is:

1. An optical low pass filter comprising:
a first portion that splits an incident light beam into a plurality of light beams having a predetermined split width in a predetermined direction, and emits the light beams; and
a second portion that splits the incident light beam into a plurality of light beams having a split width different from the predetermined split width in the predetermined direction, and emits the light beams,
wherein a surface of the optical low pass filter includes a structure in positions corresponding to the first portion and a structure in positions corresponding to the second portion, wherein the structures are different from each other,
wherein the optical low pass filter is made of a birefringence material, and
wherein the surface of the optical low pass filter includes a structure such that optical path lengths of light beams which pass through the positions corresponding to the first portion and the second portion are different from each other.

2. An optical low pass filter, comprising:
a plurality of portions, each of the plurality of portions splits an incident light beam in a plurality of light beams where the plurality of the portions are different from each other in split width in a predetermined direction, and emit the split light beams,
wherein a distribution of the different split widths is a distribution in which a numeric value of a discrete split width within a predetermined range is selected according to a selection probability distribution.

3. An optical low pass filter according to claim 2, wherein the selection probability distribution is a uniform distribution.

4. An optical low pass filter according to claim 2, wherein the selection probability distribution is a Gaussian distribution in which one numeric value within the predetermined range is a maximum probability.

5. An image pickup apparatus, comprising:
a photographing optical system;
an optical low pass filter disposed in an optical path of the photographing optical system, the optical low pass filter including a first portion that splits an incident light beam into a plurality of light beams having a predetermined split width in a predetermined direction, and emits the light beams, and a second portion that splits the incident light beam into a plurality of light beams having a split width different from the predetermined split width in the predetermined direction, and emits the light beams, wherein a surface of the optical low pass filter includes a structure in positions corresponding to the first portion and a structure in positions corresponding to the second portion, wherein the structures are different from each other; and
a solid-state image pickup element that receives an image that is formed by the photographing optical system,
wherein the optical low pass filter is made of a birefringence material, and
wherein the surface of the optical low pass filter includes a structure such that optical path lengths of light beams which pass through the positions corresponding to the first portion and the second portion are different from each other.

6. An image pickup apparatus, comprising:
a photographing optical system;
an optical low pass filter disposed in an optical path of the photographing optical system, the optical low pass filter including a plurality of portions, each of the plurality of portions splits an incident light beam in a plurality of light beams where the plurality of the portions are different from each other in split width in a predetermined direction, and emit the split light beams, wherein a distribution of the different split widths is a distribution in which a numeric value of a discrete split width within a predetermined range is selected according to a selection probability distribution; and
a solid-state image pickup element that receives an image that is formed by the photographing optical system.

7. An image pickup apparatus according to claim 6, wherein the selection probability distribution is a uniform distribution.

8. An image pickup apparatus according to claim 6, wherein the selection probability distribution is a Gaussian distribution in which one numeric value within the predetermined range is a maximum probability.

* * * * *